United States Patent [19]

Nagasawa et al.

[11] Patent Number: 4,677,503
[45] Date of Patent: Jun. 30, 1987

[54] MULTIPLE MODE ROTARY HEAD REPRODUCING APPARATUS WITH INTEGRATOR CONTROL OF SPEED

[75] Inventors: Kenichi Nagasawa; Nobutoshi Takayama, both of Kanagawa, Japan

[73] Assignee: Canon Kabushiki Kaisha, Tokyo, Japan

[21] Appl. No.: 795,186

[22] Filed: Nov. 5, 1985

[30] Foreign Application Priority Data

Nov. 8, 1984 [JP] Japan ................... 59-235601

[51] Int. Cl.$^4$ .................. G11B 15/467; G11B 5/52
[52] U.S. Cl. ................... 360/73; 360/10.3; 360/70
[58] Field of Search .............. 360/10.2, 10.3, 18, 360/27, 69, 70, 71, 73, 77, 19, 20, 64, 33.1; 358/310, 321, 323

[56] References Cited

U.S. PATENT DOCUMENTS

| | | | |
|---|---|---|---|
| 4,361,857 | 11/1982 | Sakamoto | 360/77 |
| 4,420,778 | 12/1983 | Sakamoto | 360/77 |
| 4,489,352 | 12/1984 | Kobayashi et al. | 360/10.3 |
| 4,550,345 | 10/1985 | Terada et al. | 358/323 |
| 4,558,382 | 12/1985 | Edakubo et al. | 360/77 |
| 4,568,986 | 2/1986 | Furuhata et al. | 360/10.2 |

*Primary Examiner*—Raymond F. Cardillo
*Assistant Examiner*—Steven R. Garland
*Attorney, Agent, or Firm*—Toren, McGeady & Associates

[57] ABSTRACT

An information signal reproducing apparatus for reproducing information signals on a record bearing medium having said information signals recorded thereon in many recording tracks formed on the record bearing medium with intervals of a predetermined pitch. The information signal reproducing apparatus is so arranged that in a first moving mode, the record bearing medium is moved at a first moving speed wherein a reproduction head therein traces the record bearing medium in parallel to the longitudinal direction of the recording tracks, and in a second moving mode, the record bearing medium is moved with a different moving action from that in the first moving mode, and as the record bearing medium is moved based on the first moving mode or the second moving mode for tracing, by the reproduction head, the recording tracks formed on the record bearing medium and reproducing the information signals recorded in the recording tracks, a tracking error between a correct tracing position to the recording tracks and an actual tracing position of the reproduction head, is detected by using the information signals reproduced by the reproduction head, for generating tracking error signals corresponding to an amount of the tracking error and integrating such tracking error signals by an integrating device, thus effecting a control of the moving action of the record bearing medium by using the integrated tracking error signals so that a satisfactory reproduction of the information signals can be made.

9 Claims, 7 Drawing Figures

MULTIPLE MODE ROTARY HEAD REPRODUCING APPARATUS WITH INTEGRATOR CONTROL OF SPEED

BACKGROUND OF THE INVENTION

1. Field of the Invention

This invention relates to a reproducing apparatus of the kind reproducing information signals recorded in many recording tracks formed at intervals of a predetermined pitch on a record bearing medium.

2. Description of the Prior Art

In the present specification, VTR's of the rotary two-head type arranged to perform tracking by the known four-frequency pilot method are described as typical examples of the apparatuses of the above-stated kind.

Briefly stated, the VTR of this type is arranged in the following manner for obtaining a tracking control signal during a reproducing operation: FIG. 1 of the accompanying drawings shows a signal layout made on a magnetic tape by the VTR which performs tracking by the four-frequency pilot method. FIG. 2 shows the circuit arrangement including elements essential to the VTR for obtaining a tracking error signal (hereinafter referred to as an ATF signal) by the four-frequency pilot method. Referring to FIG. 1, the illustration includes a magnetic tape 1; an arrow 2 indicating a direction in which the tape 1 is to be allowed to travel; an arrow 3 indicating the tracing direction of a head; tracks A1, A2, A3 which are formed on the tape to have a first magnetizing direction respectively; and tracks B1, B2 and B3 formed to have a second magnetizing direction respectively. Pilot signals having different frequency values f1, f2, f3 and f4 are respectively superimposed on one field portions of a video signal. For example, the frequency values of these pilot signals are arranged to be f1=6.5 fH, f2=7.5 fH, f3=9.5 fH and f4=10.5 fH, wherein fH represents the horizontal scanning frequency employed for the video signal. As apparent from the illustration, the pilot signals of these frequency values are superimposed on the video signal one after another in rotation in the sequence of f1→f2→f4→f3→f1→f2. As a result, the frequency difference between the pilot signals superimposed on adjacent tracks is either fH or 3 fH. Thus, there exist two different degrees of difference between frequency values of the pilot signals superimposed on adjacent tracks. The pilot signals of different degrees of frequency difference are alternately arranged in general. In other words, in case that the pilot signals are generated one after another in the sequence of rotation f1→f2→f4→f3, it suffices to meet the condition of f4−f3=f2−f1 and f3≠f2.

The operation of the circuit arrangement shown in FIG. 2 is as follows: To a terminal 5 is supplied via a reproducing head a video signal which has the pilot signal superimposed thereon. A low-pass filter 6 (hereinafter referred to as LPF) separates the pilot signal component from the video signal. The separate pilot signal is supplied to a multiplier 8. A local pilot signal, which is generated by a local pilot signal generating circuit 7, is also supplied to the multiplier 8. The local pilot signal is arranged to have the same frequency as that of the pilot signal superimposed on the track (the main track) which is mainly traced by the reproducing head. In that instance, a difference between the local pilot signal and each of pilot signal components reproduced from two tracks adjacent to the main track is fH or 3 fH or 3 fH. These differences are respectively taken out by band-pass filters (hereinafter referred to as BPF's) 9 and 10 and are detected by detection circuits 11 and 12, respectively. Then, the output levels of these detection circuits 11 and 12 are compared by a comparator 13. The result of comparison then indicates the degree of deviation of the reproducing head from the main track.

For example, assuming that the reproducing head is now in a position as shown at a position 4a in FIG. 1, the frequency value of the local pilot signal is f4; the difference of the local pilot signal is 3 fH from the pilot signal obtained from a track B1 and is fH from another pilot signal obtained from another track B2. If the position of the reproducing head is at a position 4b as shown in FIG. 1, the frequency value of the local pilot signal is f3 differing by fH and 3 fH respectively from pilot signals obtained from tracks A2 and A3.

As apparent from the example described above, in carrying out a so-called normal reproduction, the differences (in frequency) of the local pilot signal from the pilot signals obtained (or reproduced) from tracks in front of and behind the main track, come to interchange with each other every time the tracing position of the reproducing head shifts from one main tracing track to another. Therefore, the output of the comparator 13 is produced via an inverting amplifier 14 at intervals one field. By this, the ATF signal which indicates the degree and the direction of deviation of the reproducing head from the main track is produced from a terminal 17. The illustration further includes a switching circuit 16; and a terminal 15 receiving a rectangular wave signal which alternately repeats a high level and a low level thereof for every one-field period and is obtained by detecting the rotation of the rotating reproducing head.

The local pilot signal includes four different frequency pilot signals which are produced in rotation. In the case of the normal reproduction, the rotation of these local pilot signal frequency values is of course in the sequence of f1→f2→f4→f3 which is the same as the frequency values of the pilot signals superimposed on the video signal in recording. Therefore, the local pilot signals can be obtained by operating the same pilot signal generating oscillation means which is used for recording in the same manner as in recording.

The tracking error signal (ATF signal), which is mentioned in the foregoing, is usable as it is for reproduction only when the reproduction is the normal reproduction which is to be carried out at the same tape travelling speed as the speed employed for recording. Whereas, in the event of a varied-speed-reproduction operation, wherein reproduction is to be performed by allowing the record bearing medium (or tape) to travel at a speed different from the speed employed for recording, it becomes difficult to correctly select the frequency of the local pilot signal to be generated for the reproducing operation. Other known method of using an ATF signal for tracking control includes methods of sampling and holding the ATF signal. However, these methods have been hindering reduction in size and cost of VTR's as they require complex arrangement of the circuits, etc. of the apparatuses.

SUMMARY OF THE INVENTION

It is an object of this invention to provide a reproducing apparatus capable of adequately carrying out tracking control with simple structural arrangement even in the event of a reproducing operation to be performed by allowing a record bearing medium to travel at a different speed from its travelling speed employed in recording.

It is another object of this invention to provide a reproducing apparatus capable of adequately carrying out control over the position of reproducing means relative to recording tracks even in the event of a reproducing operation to be performed by allowing a record bearing medium to travel at a different speed from its travelling speed employed in recording.

Under these objects, a reproducing apparatus, which is arranged according to this invention as an embodiment thereof to reproduce information signals recorded in many recording tracks formed at intervals of a predetermined pitch on a record bearing medium, comprises: reproducing means arranged to trace the recording tracks formed on the record bearing medium; instructing means arranged to instruct the reproducing means to perform a tracing action in a manner different from a tracing action performed at the time of recording; detecting means arranged to detect, using the output of the reproducing means, the deviation of the tracing position of the reproducing means from a correct tracing point relative to the recording tracks; integrating means arranged to integrate the output of the detecting means according to the instruction of the instructing means; moving means arranged to move the record bearing medium transverse to the recording tracks; and control means arranged to control the moving means on the basis of the output of the integrating means.

The above and other objects and features of this invention will become apparent from the following detailed description of an embodiment thereof taken in connection with the accompanying drawings.

DETAILED DESCRIPTION OF THE PREFERRED EMBODIMENT

Figure 1:
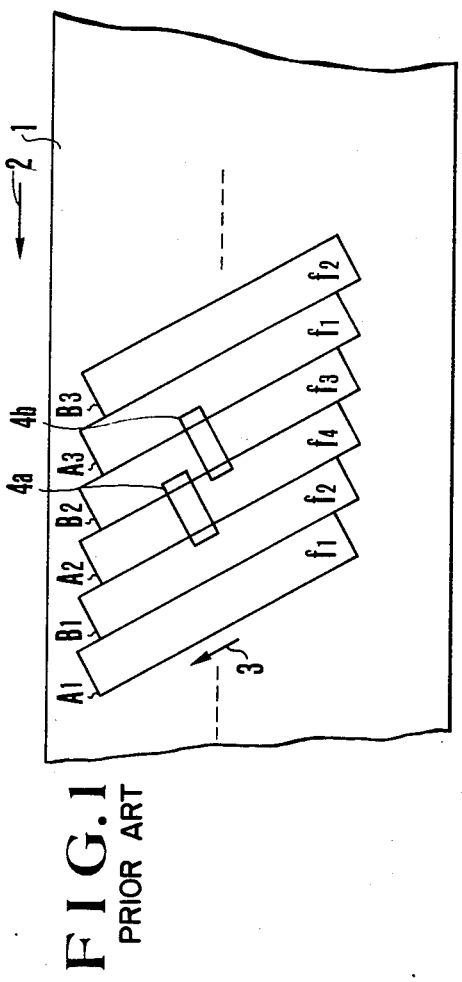
FIG. 1 is an illustration showing the arrangement of signals recorede on a magnetic tape by VTR of the kind performing tracking control by the four-frequency pilot signal using method.
Figure 2:
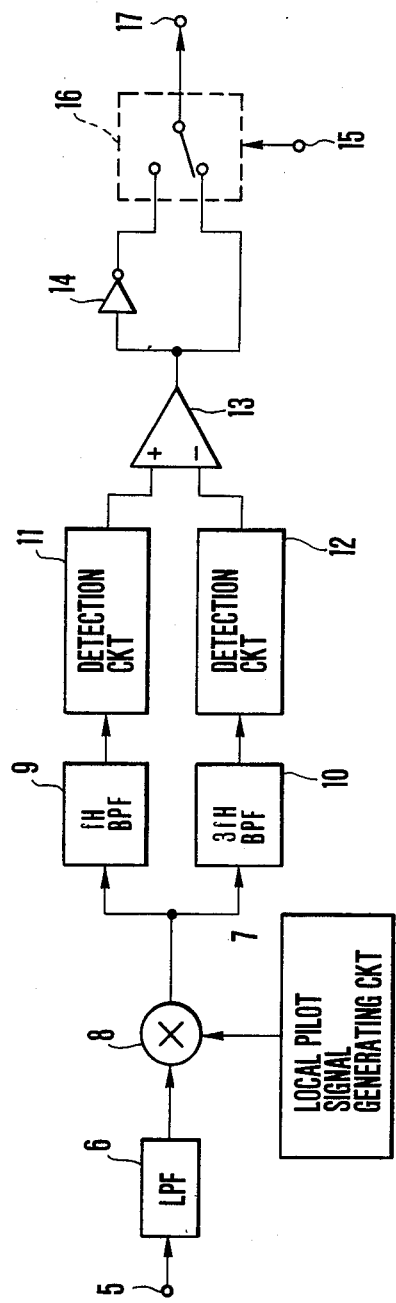
FIG. 2 is a diagram showing a circuit arrangement required for obtaining a tracking error signal by the four-frequency pilot signal method.
Figure 3:
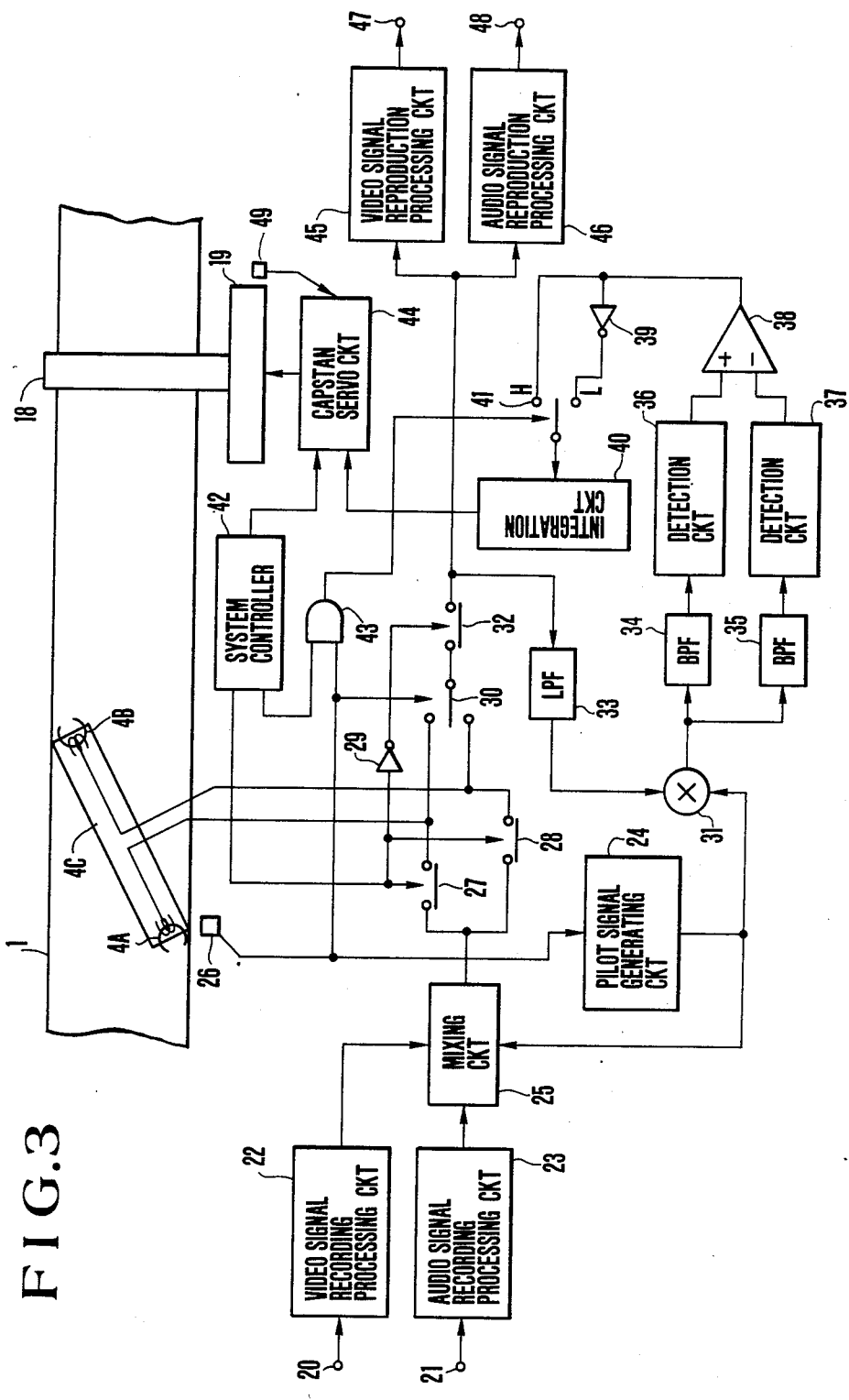
FIG. 3 is a circuit diagram showing the outline of arrangement of a VTR arranged according to this invention as an embodiment thereof.

The following description of a preferred embodiment of this invention shows the details of the invention: FIG. 3 shows the outline of an arrangement of a VTR which is arranged according to this invention as the embodiment thereof. FIGS. 4A to 4D show, in a timing chart, the operations of the various parts shown in FIG. 3.

First, the recording operation of the VTR is described. A video signal is supplied to a terminal 20 and an audio signal to another terminal 21. The video signal and the audio signal are then respectively processed into signal forms suitable for recording by a video signal processing circuit 22 and an audio signal processing circuit 23. These processed signals are supplied to a mixing circuit 25. A detector 26 is arranged to detect the rotation of a rotary drum 4C which carries rotary heads 4A and 4B. The detector 26 produces a rectangular waveform signal (hereinafter referred to as a 30 PG signal) the level of which alternately becomes high and low at intervals of a one-field period. The 30 PG signal is supplied to a pilot signal generating circuit 24. In response to this, the circuit 24 generates pilot signals of different frequency values f1, f2, f3 and f4 one after another, in rotation, at the intervals of the one-field period in the sequence of f1→f2→f4→f3→f1. These pilot signals are superimposed on the audio signal and the video signal at the mixing circuit 25.

In recording, the system controller 42 causes switches 27 and 28 to turn on and, via an inverter 29, causes a switch 32 to turn off. As a result, the output of the mixing circuit 25 is supplied to the heads 4A and 4B to be recorded on a magnetic tape 1.

For normal reproduction, the VTR according to this invention operates in the following manner: Reproduction signals obtained by the heads 4A and 4B are combined back into an original continuous signal by a switch 30 under the control of the 30 PG signal. The signal thus obtained is supplied via the switch 32 to a video signal reproduction processing circuit 45, an audio signal reproduction processing circuit 46 and an LPF circuit 33. Reproduced video and audio signals in their original signal forms are then obtained in a known manner from these video and audio signal reproduction processing circuits 45 and 46. Meanwhile, the LPF 33 separates pilot signal components from the incoming signal. A multiplier 31 performs a multiplying operation on the separated pilot signal component and the pilot signal of the main track, i.e. a recording track being mainly traced for reproduction. As mentioned in the foregoing, the output of the multiplier 31 is supplied to an ATF signal generating circuit which includes BPF's 34 and 35, detection circuits 36 and 37 and a comparator 38. Then, the system controller 42 supplies a high level signal to an AND gate 43. A switch 41 is shifted from one position to another at intervals of a one-field period. An ATF signal thus obtained from the switch 41 is supplied via an integrating circuit 40 to a capstan servo circuit 44. The rotation of the capstan 18 is thus controlled to have the heads 4A and 4B to accurately trace the recording tracks. A rotation detector 49 is arranged to detect the rotation of the fly-wheel of the capstan 18. The detection output of the detector 49 is supplied to the capstan servo circuit 44 and is mainly used for causing the capstan 18 to rotate at a constant speed.

In the event of reverse reproduction, wherein the tape is driven to travel at the same speed but in the direction reverse to the direction in which recording has been performed, the VTR according to the invention operates as follows: Upon receipt of an instruction for reverse reproduction from the system controller 42, the capstan servo circuit 44 causes the capstan 18 to rotate at the same speed as and in the direction reverse to the recording operation. A low level signal is then supplied to the AND gate 43. As a result of this, the output level of the AND gate becomes low and remains low thereafter. This causes the switch 41 to remain in connection with the terminal L thereof.

Figures 4A, 4B, 4C, 4D:
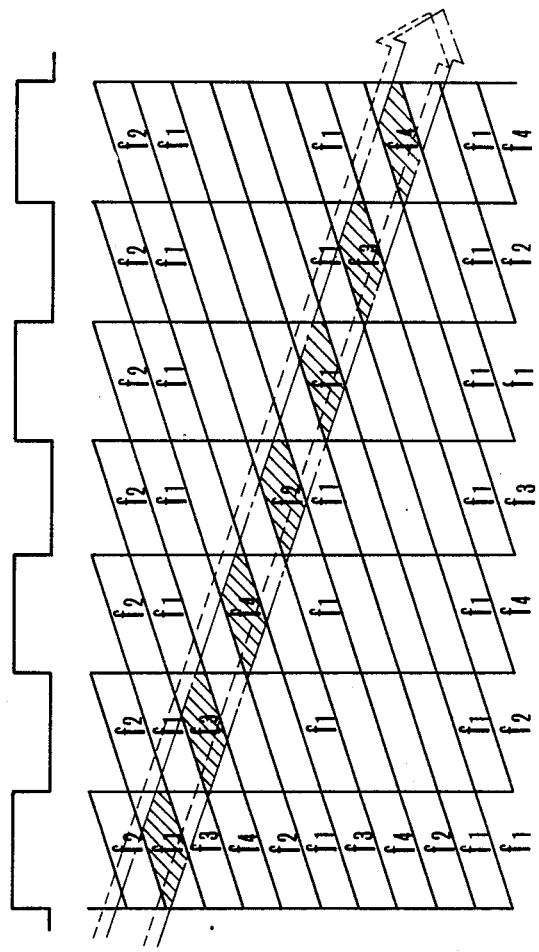
FIGS. 4A to 4D show in a timing chart the operations of the various parts shown in FIG. 3.

The 30 PG signal and the tracing locus of the head which are arranged to obtain in reverse reproduction are as shown in FIGS. 4A and 4B. In FIG. 4B, a one-dot-chain line indicates an ideal tracing locus for reproduction. As apparent from the illustration, the frequency rotation of the pilot signals reproduced from the main tracks is in the sequence of f1→f3→f4→f2→f1→. Whereas the frequency rotation of the local pilot signal supplied to the multiplier 31 is in the sequence of f1→f2→f4→f3→which is the same as the sequence employed in recording and normal reproduction. Meanwhile, the frequency differences of the pilot signals reproduced from two adjacent tracks from the local pilot signal are fH and 3 fH components. Besides, the direction in which these fH and 3 fH components are obtained remains unchanged relative to the travelling direction of the tape. Therefore, the signal obtained via the comparator 38 and the inverter 39 becomes the ATF signal as it is. The ATF signal thus obtained is supplied via the terminal L of the switch 41 to the integrating circuit 40. The ATF signal and the output of the integrating circuit 40 obtained, in this instance are as shown in FIGS. 4C and 4D, respectively. In FIGS. 4C and 4D, full lines indicate the respective signals obtained when the heads 4A and 4B are tracing the ideal tracing loci, respectively. Broken lines indicate signals obtained when these heads are tracing a little behind the ideal loci (see the tracing locus indicated in FIG. 4B). When the tracing loci of the heads 4A and 4B are as shown by the broken line in FIG. 4B, the level of the output of the integrating circuit 40 increases to bring the tracing loci of the heads 4A and 4B closer to their ideal tracing loci.

In this embodiment, the integrating circuit 40 is arranged to produce a signal representing the average level (FIG. 4D) of the ATF signal indicated in FIG. 4C. In accordance with this invention, the integrating circuit 40 includes a low-pass filter (LPF). The LPF is required to be capable of removing frequency components higher than 60 Hz and is preferably arranged to have, for example, a cut-off frequency value of 15 Hz or thereabout.

The VTR arranged in accordance with this invention as described in the foregoing is capable of carrying out reverse reproduction with simple structural arrangement and without necessitating any special change in the arrangement of the pilot signal generating circuit 24.

While the foregoing description of this embodiment has included a reverse reproducing operation by way of example, this invention is advantageous also for a reproducing operation to be performed by allowing the record bearing medium to travel at a speed differing from the speed employed in recording. This invention is particularly advantageous in cases where the reproducing travelling speed of the record bearing medium is 4n-1 (wherein "n" is selected from integers including zero) times as high as the travelling speed of the medium employed in recording.

What is claimed is:

1. A reproducing apparatus for oblique reproducing information signals recorded in many recording tracks formed at intervals of a predetermined pitch on a record bearing medium, comprising:
    (a) reproducing means arranged to trace said recording tracks formed on said record bearing medium;
    (b) moving means for moving said record bearing medium relative to said reproducing means;
    (c) instructing means for instructing said moving means to move said record bearing medium either in a first moving mode in which said record bearing medium is moved at a first moving speed such that said reproducing means traces the record bearing medium in parallel to the longitudinal direction of said recording tracks, or in a second moving mode in which said record bearing medium is moved with a different moving action from that in the first moving mode;
    (d) detecting means for detecting deviation of a tracing position of said reproducing means from a correct tracing point relative to said recording tracks, said detecting means using an output of said reproducing means and producing detection signals corresponding to an amount of said deviation;
    (e) integrating means for integrating at least one said detection signals at least during a period of time when the second moving mode is instructed by said instructing means; and
    (f) moving control means for controlling said moving means in response to said integrating means.

2. An apparatus according to claim 1, wherein said reproducing means includes a rotary magnetic head.

3. An apparatus according to claim 1, wherein said integrating means includes a low-pass filter.

4. An apparatus according to claim 1, wherein said second moving mode includes a moving mode for moving said record bearing medium at said first moving speed in a direction reverse to that in the first moving mode.

5. A reproducing apparatus, of the kind for reproducing a video signal recorded in many oblique recording tracks formed at intervals of a predetermined pitch on a record bearing medium with pilot signals of different frequency values superimposed on said video signal one after another in rotation in a predetermined sequence, comprising:
    (a) reproducing means arranged to trace said recording tracks formed on said record bearing medium;
    (b) reference signal generating means arranged to generate, one by one, four different reference signals of different frequency values which are, respectively, the same as those of said pilot signals;
    (c) moving means for moving said record bearing medium relative to said reproducing means;
    (d) instructing means for instructing said moving means to move said record bearing medium either in a first moving mode in which said record bearing medium is moved at a first moving speed so that said reproducing means traces the record bearing medium in parallel to the longitudinal direction of said recording tracks or in a second moving mode in which said record bearing medium is moved with a different moving action from that in the first moving mode;
    (e) detecting means arranged to detect deviation of a tracing position of the reproducing means from a correct tracing point relative to the recording tracks, said detecting means using said reference signals generated by said reference signal generating means and pilot signals reproduced by said reproducing means to produce outputs;
    (f) integrating means for integrating at least one of said outputs of said detecting means at least during a period of time when said second moving mode is instructed by the instruction means; and
    (g) moving control means for controlling said moving means in response to said integrating means.

6. An apparatus according to claim 5, wherein said detecting means includes:
    (a) multiplying means arranged to perform a multiplying operation on said pilot signals reproduced by said reproducing means and said reference signals generated by said reference signal generating means and to produce therefrom a multiplication signal;

(b) separating means for separating a detection signal of a predetermined frequency from the output of said multiplying means;

(c) error signal generating means for generating an error signal representing a degree of deviation of the tracing position of said reproducing means from the correct tracing point of said recording track being traced by the reproducing means, said error signal generating means being arranged to operate on the basis of said detection signal;

(d) phase inverting means for inverting a phase of said error signal; and (e) phase inversion control means for controlling a phase inverting action in said phase inverting means corresponding to the moving mode instructed in said instructing means.

7. A reproducing apparatus according to claim 5, wherein said phase inversion control means is arranged to control the phase inversion action of said phase inverting means so that said phase inversion control means inverts a phase of said error signal at every predetermined interval during a period of time when the first moving mode is instructed by said instructing means and always inverts the phase of said error signal during a period of time when the second moving mode is instructed.

8. An apparatus according to claim 5, wherein said integrating means includes a low-pass filter.

9. An apparatus according to claim 5, wherein said second moving mode includes a moving mode to move said record bearing medium at a first moving speed in a direction reverse to that in said first moving mode.

* * * * *